United States Patent [19]

Feldmann-Krane et al.

[11] Patent Number: 5,733,971
[45] Date of Patent: Mar. 31, 1998

[54] AQUEOUS AND RADIATION-CURABLE PRINTING VARNISHES AND PRINTING INKS WITH IMPROVED PROPERTIES

[75] Inventors: Georg Feldmann-Krane, Mülheim; Petra Hinrichs, Bochum; Stefan Silber, Krefeld; Susanne Struck, Moers, all of Germany

[73] Assignee: Th. Goldschmidt AG, Essen, Germany

[21] Appl. No.: 779,636

[22] Filed: Jan. 7, 1997

[30] Foreign Application Priority Data

Jan. 22, 1996 [DE] Germany ............ 196 02 097.2

[51] Int. Cl.$^6$ ............................................. C08K 3/20
[52] U.S. Cl. ............ 524/837; 106/287.15; 106/287.14; 106/287.1; 556/445; 528/32; 522/99
[58] Field of Search ............ 106/287.15, 287.14, 106/287.1; 524/837; 556/445; 528/32; 522/99

[56] References Cited

U.S. PATENT DOCUMENTS

| | | | |
|---|---|---|---|
| 3,402,192 | 9/1968 | Haluska | 260/448.2 |
| 3,427,271 | 2/1969 | McKellar | 106/287.14 |
| 3,746,653 | 7/1973 | Churchfield et al. | 252/321 |
| 3,763,021 | 10/1973 | Householder | 203/20 |
| 3,784,479 | 1/1974 | Keil | 252/358 |
| 3,865,544 | 2/1975 | Keil | 8/93 |
| 4,348,431 | 9/1982 | O'Malley | 427/387 |
| 4,743,648 | 5/1988 | Hill et al. | 524/731 |
| 4,886,551 | 12/1989 | Fink et al. | 106/183 |
| 5,262,087 | 11/1993 | Tachibana et al. | 252/309 |
| 5,436,284 | 7/1995 | Honda et al. | 523/122 |

FOREIGN PATENT DOCUMENTS

| | | |
|---|---|---|
| 1165028 | 11/1962 | Germany . |
| 3637155 | 10/1986 | Germany . |

*Primary Examiner*—Margaret W. Glass
*Attorney, Agent, or Firm*—Anderson, Kill & Olick, P.C.

[57] ABSTRACT

Aqueous and radiation-curable printing varnishes and printing inks, are disclosed which contain special polyoxyalkylene polysiloxane copolymers. These printing varnishes and printing inks have improved scratch resistance, a higher gliding ability and an extremely low tendency to foam, so that the production of printing inks proceeds without problems and, at the same time, an optically attractive typography can be obtained.

4 Claims, No Drawings

AQUEOUS AND RADIATION-CURABLE PRINTING VARNISHES AND PRINTING INKS WITH IMPROVED PROPERTIES

FIELD OF INVENTION

The invention relates to aqueous and radiation-curable printing varnishes and printing inks, which contain special polyoxyalkylene polysiloxane copolymers. These printing varnishes and printing inks have improved scratch resistance, increased sliding ability, as well as an extremely low tendency to foam, so that the production of printing inks proceeds with less problems and, at the same time, an optically attractive typography can be obtained.

BACKGROUND INFORMATION AND PRIOR ART

A constantly increasing number of printing inks and printing varnishes are being changed over to ecologically safer, water-based and radiation-curable systems. These systems are known and described, for example, in "The Printing Ink Manual" (R. H. Leach, R. J. Pearce, London 1993) or "UV and EB Curing Formulation for Printing Inks, Coatings and Paints" (R. Holeman, P. Oldring, London 1988).

Their production and especially their processing properties are causally linked to the additives used. Because of the binders and wetting agents used, aqueous printing inks and printing varnishes have a great tendency to foam. This becomes noticeable, not only during the production of these inks, but also especially during the application, when high amounts of air are introduced into the printing inks and printing varnishes.

Defoaming is frequently also a very critical problem for radiation-curable systems. In order to achieve a defoaming effect, a certain incompatibility is necessary. Radiation-curable systems frequently also have a very low dissolving power, so that the addition of known defoaming substances (such as silicone oils) easily leads to cloudiness, flow disorders or gloss reduction particularly in the case of printing varnishes.

The use of silicone oils, particularly of dimethylpolysiloxanes of low to moderate viscosity, for defoaming aqueous and radiation-curable printing inks is known and described, for example, in the book by W. Noll, "Chemie und Technologie der Silicone" (Chemistry and Technology of the Silicones) or in the aforementioned literature. The use of polyoxyalkylene polysiloxane copolymers as defoaming agents is also known. The U.S. Pat. No. 3,763,021 discloses a preparation for defoaming aqueous latexes, which is composed of (1) 1 to 20% by weight of a siloxane glycol copolymer of the general formula

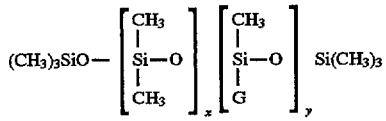

wherein x has an average value of 6 to 420 and y an average value of 3 to 30 and G represents a group having the structure —D(OR)$_z$A, in which D is an alkylene group, R represents ethylene groups and propylene groups or butylene groups in such a ratio of ethylene groups to other alkylene groups, that the ratio of carbon atoms to oxygen atoms in all OR blocks ranges from 2.3:1 to 2.8:1, z has an average value of 25 to 100 and A is a terminal group, (2) 65 to 98% by weight of polypropylene glycol with an average molecular weight ranging from 1000 to 2000 and (3) 1 to 15% by weight of a hydrophobic silicon oxide.

Typical methods for producing these aforementioned polyoxyalkylene polysiloxane copolymers are described in U.S. Pat. No. 3,402,192, U.S. Pat. No. 3,746,653, U.S. Pat. No. 3,784,479 and U.S. Pat. No. 3,865,544.

These preparations, containing silicone oils or polyoxyalkylene polysiloxane copolymers, as known in the art, are suitable to a greater or lesser extent to prevent the formation of foam or destroy already existing foam in aqueous or radiation-curable printing inks or printing varnishes. However, it has turned out that printing varnishes and printing inks, to which polysiloxanes or polyoxyalkylene polysiloxane copolymers were added for defoaming, frequently have wetting defects or reduced gloss when applied on surfaces. This becomes evident particularly in highly sensitive systems and for printing on critical substrates (such as polyolefin film).

An important field of use are printing inks for paper and film. The handling of these objects for the industrial production of these printed products creates difficulties, because it is not always possible to avoid damaging the surface of the elements, which are often stacked or transported after the printing process.

Attempts have already been made to improve the ability to manipulate freshly printed objects by adding friction reducing additives, such as oils or waxes (for example, polyethylene or polytetrafluoroethylene waxes) to the printing ink or applying these subsequently on the printed surface. This frequently also leads to a disturbing loss of gloss. Also subsequent application of wax on the printed product may not always be satisfactory, particularly since the manufacturing costs are increased by this additional processing step. Furthermore, high use concentrations are required in order to achieve an improvement in the scratch resistance.

In much the same way as in air drying or forced (temperature) drying system, silicone oils, organically modified siloxanes, such as polyoxyalkylene polysiloxane copolymers (for example, German patent 36 37 155) or also spherical silicone elastomer particles are also added for these purposes at the present time to aqueous and radiation-curable printing varnishes and printing inks.

However, the aforementioned polyoxyalkylene polysiloxane copolymers, which effectively improve scratch resistance only at very high concentrations, lead to appreciable foam stabilization. Such foam stabilization is undesirable for the production of printing inks as well as for the actual printing process, since the printing result or the typography is negatively affected. On the other hand, those skilled in the art are also aware that the use of spherical, elastomeric silicone particles can lead to a reduction in gloss and can also lead to various wetting defects.

There is therefore a practical need for modified silicone additives, which in small concentrations improve the ability to manipulate objects, particularly objects printed serially. These additives are needed to, in particular, improve the scratch resistance of fresh surfaces, increase the sliding ability of these surfaces and, at the same time, prevent the formation of foam or destroy foam already formed, without having a negative effect on the typography.

Moreover, such additives shall be universally usable that is, largely independent of the nature and composition of the printing inks and printing varnishes to which they are added in order to improve the aforementioned properties. These additive should be effective in the least possible quantities and should not adversely affect the application properties of the printing inks and the printing varnishes. In particular, they should not have a harmful effect on the development of the surface film and the curing of the printing inks. Furthermore, they may not have a disadvantageous effect on the stability of the printing inks and the printing varnishes and should not make the running properties worse.

OBJECT OF THE INVENTION

It is therefore an object of the invention to provide compounds which fulfill the aforementioned requirements and are effective when added in small amounts.

SUMMARY OF THE INVENTION

Pursuant to the invention, this objective is accomplished by aqueous and radiation-curable printing varnishes and printing inks, which contain polyoxyalkylene polysiloxane copolymers of the general formula $$R^3[(OC_3H_6-)_y(OC_2H_4-)_x]R^2-$$

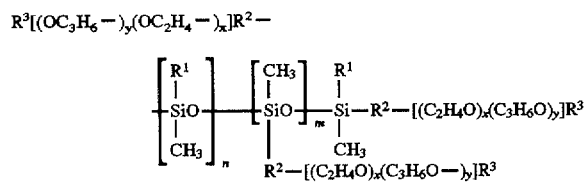

wherein
R$^1$=an alkyl group with 1 to 8 carbon atoms,
R$^2$=(CH$_2$)$_p$O—, wherein p=2, 3 or 4, the number of methylalkylsiloxy units and determining the chain length. For the compounds, which are to be used pursuant to the invention, n has a numerical value of 40 to 60. It is well known to those skilled in the art that the compounds are present in the form of a mixture with a distribution determined essentially by the laws of statistics. The value of n therefore represents the average value of the number of methylalkylsiloxy units.

The value of m is 0 to 3 and preferably 0 to 1. If m=0, the compounds are linear siloxanes, which have terminal polyoxyalkylene units. The polyoxyalkylene blocks consist of oxyethylene and oxypropylene units, the molecular weight of the polyoxyalkylene blocks being 300 to 800 g/mole. The molar ratio of oxyethylene units to oxypropylene units, expressed by the ratio of x:Y, is 0.2 to 0.7. It has turned out that these structures of the block copolymers are of decisive importance for the advantages achieved pursuant to the invention.

For formulating radiation-curable systems in the printing ink industry, it is constantly becoming more important to increase the proportion of cross-linkable components in the formulation. The use of acrylated or methacrylated and thus cross-linkable additives minimizes their tendency to migrate and the proportion of substances extractable from the film. Their use in radiation-curable printing varnishes and printing inks is therefore particularly preferred.

Examples of polyoxyalkylene polysiloxane copolymers, which can be used pursuant to the invention and are particularly suitable are

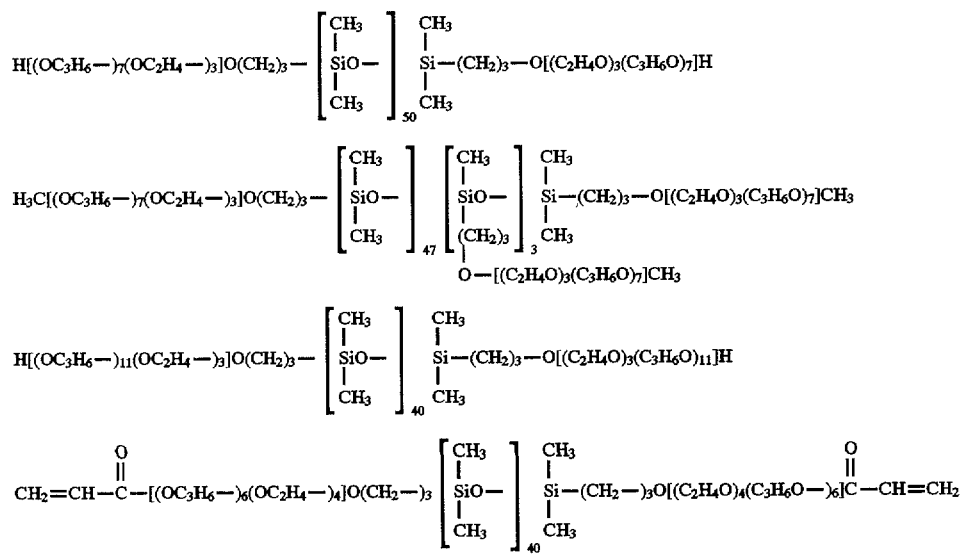

R$^3$=hydrogen, an alkyl group with 1 to 4 carbon atoms or a (meth) acryloxy group,
n=40 to 60 and
m=0 to 3,
x and y being selected so that the average molecular weight (Mw) of the polyoxyalkylene blocks is 300 to 800 g/mole and the molar ratio of x:y is 0.2 to 0.7,
in amounts of 0.001 to 1.5% by weight based on the varnish formulation, for improving scratch resistance and for defoaming.

The numerical values of the subscripts n and m are of vital importance for the properties of the compounds; n indicating These polyoxyalkylene polysiloxane copolymers are synthesized by the addition reaction between polyoxyalkylene glycols or polyoxyalkylene ethers of olefinically unsaturated alcohols, such as allyl polyoxyalkylene ethers, and appropriate hydrogensiloxanes. This reaction is catalyzed by platinum compounds and described, for example, in the German patent 11 65 028.

Any free polyoxyalkylene glycols or their monoethers or monoesters which, due to the synthesis procedure, are contained in the copolymers to be used pursuant to the invention, can be tolerated and do not have to be removed from the product.

By reacting hydroxy-functional polyoxyalkylene-polysiloxane copolymers with acrylic acid or methacrylic acid or their esters, the corresponding acryloxy-functional or methacryloxy-functional polyoxyalkylene polysiloxane copolymers can be obtained by esterification and transesterification reactions known in the art.

The polyoxyalkylene polysiloxane copolymers can be used as such or in the form of aqueous emulsions.

The compounds, which are to be used pursuant to the invention, are added to aqueous, radiation-curable printing varnishes and printing inks in amounts of 0.001 to 1.5% by weight, based on the formulation of the paint or varnish.

The polyoxyalkylene polysiloxane copolymers which are to be tested, correspond to the general formula I, in which the $R^1$, $R^2$ and $R^3$ groups as well as the subscripts n, m, x and y have the meanings or values given in the table below.

TABLE

| Compound | n | m | x | y | x/y | R1 | R2 | R3 |
|---|---|---|---|---|---|---|---|---|
| 1 | 50 | 0 | 3 | 7 | 0.43 | methyl | propoxy | H |
| 2 | 47 | 3 | 3 | 7 | 0.43 | methyl | propoxy | methyl |
| 3 | 40 | 0 | 3 | 11 | 0.28 | methyl | propoxy | H |
| 4 | 40 | 0 | 4 | 6 | 0.66 | methyl | propoxy | acryl |
| 5 | 20 | 0 | 3 | 7 | 0.43 | methyl | propoxy | H |
| 6 | 20 | 0 | 3 | 7 | 0.43 | methyl | propoxy | H |
| 7 | 50 | 0 | 9 | 21 | 0.43 | methyl | propoxy | H |
| 8 | 47 | 3 | 7 | 7 | 1 | methyl | propoxy | H |
| 9 | 47 | 3 | 7 | 7 | 1 | methyl | propoxy | acryl |
| 10 | 40 | 0 | 0 | 10 | 0 | methyl | propoxy | methyl |

The application properties of various compounds 1 to 4, which are to be used pursuant to the invention, as well as of the compounds of the comparison examples 5 to 10 are shown in the following.

For checking the application properties, the following formulations of aqueous and radiation-curable printing varnishes and printing inks were selected. The numerical data is given in % by weight.

1. Aqueous Test Systems

Printing Varnish 1

| | | |
|---|---|---|
| Neocryl BT 21 Solution. *) | 39.0 | |
| Neocryl BT 44 | 48.5 | styrene modified acrylate emulsion/Zeneca |
| Isopropanol | 3.8 | |
| Propylene glycol | 1.9 | |
| Aquacare 531 | 1.9 | wax emulsion/W. Priem GmbH & Co. KG |
| Waer, demineralized | 4.7 | |
| Additive | 0.2 | |
| | 100.0 | |
| *) Neocryl BT 21 | 62.5 | anionic acrylate emulsion/Zeneca |
| Ammonia, 25% | 3.3 | |
| Isopropanol | 4.0 | |
| Water, demineralized | 30.2 | |
| | 100.0 | |

Printing Varnish 2

| | | |
|---|---|---|
| Joncryl 74 | 50.5 | Acrylate dispersion/Johnson Polymer |
| Joncryl 680 solution *) | 23.9 | |
| Jonwax 35 | 7.2 | polyethylene wax emulsion/Johnson Polymer |
| Water, demineralized | 12.4 | |
| Isopropanol | 2.9 | |
| Zinc solution | 2.9 | |
| Additive | 0.2 | |
| | 100.0 | |
| *) Joncryl 680 | 45.0 | acrylate resin/Johnson Polymer |
| Ammonia, 25% | 11.2 | |
| Isopropanol | 10.0 | |
| Water, demineralized | 33.8 | |
| | 100.0 | |

Printing Varnish 3

| | | |
|---|---|---|
| Joncryl 90 | 51.4 | Styrol acrylate dispersion/Johnson Polymer |
| Joncryl 682 solution *) | 25.7 | |
| Dowanol DPM | 1.8 | |
| Jonwax 35 | 4.6 | polyethylene wax emulsion/Johnson Polymer |
| Isopropanol | 3.7 | |
| Water, demineralized | 8.9 | |
| Dioctyl sulfosuccinate solution 50% | 3.7 | |
| Additive | 0.2 | |
| | 100.0 | |
| *) Joncryl 682 | 47.3 | Acrylate resin/Johnson Polymer |
| Ammonia, 25% | 15.8 | |
| Isopropanol | 5.3 | |
| Water, demineralized | 31.6 | |
| | 100.0 | |

Printing Ink 1

Material to be milled:

| | | |
|---|---|---|
| Joncryl 61 | 18.7 | Acrylate resin solution/Johnson Polymer |
| Foamex 810 | 0.1 | Defoamer/Tego Chemie Service |
| Water, demineralized | 7.5 | |
| Heliogenblau D7080 | 11.2 | Phthalocyanine blue/BASF |

Dispersed for one hour (equipment: Scandex)

Lacquer deposit:

| | | |
|---|---|---|
| Joncryl 8051 | 46.2 | Acrylate dispersion/Johnson Polymer |
| Jonwax 35 | 4.7 | Polyethylene wax emulsion/Johnson Polymer |
| Additive | 0.1 | |
| Water, demineralized | 6.8 | |
| Isopropanol | 4.7 | |

Dispersed for 5 minutes (equipment: Scandex)

| | 100.0 | |

2. Radiation-Curable Systems

| | | |
|---|---|---|
| Ebecryl 608 | 40.0 | Epoxy acrylate oligomer/UCB |
| TPGDA | 19.0 | Difunctional acrylate monomer/UCB |
| Ebecryl P 115 | 5.0 | Tertiary amine/UCB |
| OTA 480 | 20.0 | Trifunctional acrylate oligomer/UCB |
| Benzophenone | 3.0 | Photoinitiator/UCB |
| Irgacure 651 | 2.0 | Photoinitiator/UCB |
| Additive | 1.0 | |
| | 100.0 | |

Printing Varnish B

| | | |
|---|---|---|
| Ebecryl 204 | 41.5 | PU acrylate/UCB |
| TPGDA | 41.0 | Difunctional acrylate monomer/UCB |
| Darocure 1173 | 4.0 | Photoinitiator/Ciba-Geigy |
| Ebecryl P 115 | 8.0 | Tertiary amine/UCB |
| Additive | 1.0 | |
| | 100.0 | |

The aqueous and radiation-curable printing inks are formulated in the usual manner in accordance with the formulations above. In each case, the additives are added as the last component and are incorporated by means of a Perlmill disk for 3 minutes at 1500 rpm. The printing ink is produced with the formulation above, using a Scandex for the dispersing, and the additives are the last components to be added to the lacquer deposit.

The radiation-curable printing varnishes are applied with a spiral doctor blade (12 μm) on wet Lenetta film, which has been pretreated with a corona discharge, and the printing inks are applied with a doctor blade on transparent PVC film. Curing is accomplished by two passages through 120 watt/cm ultraviolet light at a speed of 20 m/min.

Scratch resistance is the ability of a surface to resist visible, linear damage by hard objects moving in contact with the surface. Specially converted film-drawing equipment, which is driven by an electric motor, is used for the measurement of so-called scratch values. Instead of the film-drawing doctor blade, a plate is mounted on the moving doctor blade holder; at the other end of the equipment the plate lies on rollers. The plate, on which the substrate (with the film coated with the printing ink) is fastened, can be moved with the help of the doctor blade holder. In order to simulate scratch stresses, a block with three points is placed on the printing ink film and loaded down with 500 g. The test film on the plate is pulled at a speed of 12 mm/sec under the weight. The vertical force required for this is measured and referred to as the scratch value. Scratch values are determined 24 hours after the film is cured.

If the points are replaced by hemispheres and the procedure above is followed, the so-called sliding value is measured as a frictional force.

Foaming Test

The aqueous printing varnish or printing ink (50 g) is weighed into a 150 mL beaker and sheared for 1 minute at 250 rpm with a Dissolver disk (3 cm diameter). Subsequently, 45 g are weighed into a measuring cylinder and the foam height is given in mm.

Deaeration Test

The radiation-curable printing varnish (30 g) is weighed into a 50 mL screw-top jar and sheared for 5 minutes at 3000 rpm with a Dissolver disk (2 cm diameter). The foam height is measured in mm and the decay height of the foam is measured in hours.

Wetting Behavior

The films, produced as described previously, are examined visually for wetting disorders and evaluated on a scale from 1 to 4, 1 being a defect-free film and 4 being a film with many wetting defects.

Results in Printing Varnish 1

| Compound | Concentration | Foam Value mL/45 g | Scratch Value mN/m | Sliding Value mN/m | Wetting Behavior (Scale of 1–4) |
|---|---|---|---|---|---|
| Blank | 0 | 110 | 234 | 230 | 1 |
| 1 | 0.2 | 48 | 108 | 78 | 1 |
| 2 | 0.2 | 50 | 92 | 74 | 1 |
| 3 | 0.2 | 47 | 125 | 92 | 1 |
| 4 | 0.2 | 52 | 83 | 67 | 1 |
| 5 | 0.2 | 53 | 170 | 134 | 1 |
| 6 | 0.2 | 57 | 155 | 128 | 1 |
| 7 | 0.2 | 72 | 136 | 100 | 2 |
| 8 | 0.2 | 75 | 98 | 79 | 1 |
| 9 | 0.2 | 73 | 104 | 79 | 1 |
| 10 | 0.2 | 52 | 180 | 134 | 3 |

Results in Printing Varnish 2

| Compound | Concentration | Foam Value mL/45 g | Scratch Value mN/m | Sliding Value mN/m | Wetting Behavior (Scale of 1–4) |
|---|---|---|---|---|---|
| Blank | 0 | 69 | 185 | 107 | 1 |
| 1 | 0.2 | 46 | 100 | 62 | 1 |
| 2 | 0.2 | 48 | 90 | 58 | 1 |
| 3 | 0.2 | 46 | 102 | 66 | 1 |
| 4 | 0.2 | 47 | 85 | 63 | 1 |
| 5 | 0.2 | 51 | 152 | 95 | 1 |
| 6 | 0.2 | 53 | 155 | 92 | 1 |
| 7 | 0.2 | 65 | 118 | 70 | 2 |
| 8 | 0.2 | 63 | 98 | 64 | 1 |
| 9 | 0.2 | 60 | 104 | 61 | 1 |
| 10 | 0.2 | 48 | 123 | 70 | 4 |

Results in Printing Varnish 3

| Compound | Concentration | Foam Value mL/45 g | Scratch Value mN/m | Sliding Value mN/m | Wetting Behavior (Scale of 1–4) |
|---|---|---|---|---|---|
| Blank | 0 | 103 | 182 | 142 | 1 |
| 1 | 0.2 | 47 | 108 | 90 | 1 |
| 2 | 0.2 | 48 | 90 | 82 | 1 |
| 3 | 0.2 | 46 | 100 | 88 | 1 |
| 4 | 0.2 | 48 | 89 | 79 | 1 |
| 5 | 0.2 | 51 | 140 | 123 | 1 |
| 6 | 0.2 | 52 | 138 | 127 | 1 |
| 7 | 0.2 | 72 | 106 | 76 | 2 |
| 8 | 0.2 | 70 | 110 | 76 | 1 |
| 9 | 0.2 | 68 | 104 | 90 | 1 |
| 10 | 0.2 | 47 | 140 | 118 | 3 |

Results in Printing Ink 1

| Compound | Concentration | Foam Value mL/45 g | Scratch Value mN/m | Sliding Value mN/m | Wetting Behavior (Scale of 1–4) |
|---|---|---|---|---|---|
| Blank | 0 | 62 | 159 | 120 | 1 |
| 1 | 0.2 | 45 | 106 | 70 | 1 |
| 2 | 0.2 | 47 | 90 | 68 | 1 |
| 3 | 0.2 | 46 | 99 | 72 | 1 |
| 4 | 0.2 | 47 | 89 | 66 | 1 |
| 5 | 0.2 | 49 | 128 | 99 | 2 |
| 6 | 0.2 | 52 | 138 | 106 | 1 |
| 7 | 0.2 | 58 | 103 | 73 | 2 |
| 8 | 0.2 | 57 | 108 | 75 | 2 |
| 9 | 0.2 | 57 | 104 | 74 | 2 |
| 10 | 0.2 | 46 | 140 | 108 | 4 |

Results in Printing Varnish A

| Compound | Concentration | Foam Height mm | Foam Decay Time min | Scratch Value mN/m | Sliding Value mN/m | Wetting Behavior (Scale of 1–4) |
|---|---|---|---|---|---|---|
| Blank | 0 |    | 10 | 180 | 230 | 198 | 3 |
| 1 | 1 | 1 | 15 | 102 | 84 | 1 |
| 2 | 1 | 1 | 15 | 94 | 80 | 1 |
| 3 | 1 | 1 | 10 | 99 | 86 | 1 |
| 4 | 1 | 1 | 15 | 89 | 79 | 1 |
| 5 | 1 | 1 | 20 | 168 | 150 | 2 |
| 6 | 1 | 1 | 15 | 150 | 135 | 2 |
| 7 | 1 | 7 | 150 | 107 | 89 | 3 |
| 8 | 1 | 8 | 220 | 99 | 80 | 2 |
| 9 | 1 | 8 | 250 | 97 | 74 | 2 |
| 10 | 1 | 1 | 15 | 140 | 123 | 4 |

Results in Printing Varnish B

| Compound | Concentration | Foam Height mm | Foam Decay Time min | Scratch Value mN/m | Sliding Value mN/m | Wetting Behavior (Scale of 1–4) |
|---|---|---|---|---|---|---|
| Blank | 0 |    | 150 | 210 | 168 | 2 |
| 1 | 1 | 1 | 10 | 80 | 72 | 2 |
| 2 | 1 | 1 | 15 | 78 | 70 | 2 |
| 3 | 1 | 1 | 10 | 85 | 75 | 2 |
| 4 | 1 | 1 | 15 | 80 | 69 | 2 |
| 5 | 1 | 1 | 20 | 159 | 109 | 2 |
| 6 | 1 | 1 | 15 | 150 | 115 | 2 |
| 7 | 1 | 7 | 100 | 97 | 85 | 3 |
| 8 | 1 | 8 | 170 | 80 | 78 | 3 |
| 9 | 1 | 8 | 150 | 84 | 80 | 3 |
| 10 | 1 | 1 | 10 | 136 | 99 | 4 |

As can be seen from the preceding Tables, the compounds, which are to be used pursuant to the invention, are distinguished by their universal applicability.

As is evident from the Comparison Examples, the subscripts n and m and, the values of x and y as well as their ratio to one another are responsible for the fact that the polyoxyalkylene polysiloxane copolymers, which are to be used pursuant to the invention, are excellent defoamers and, at the same time, increase the scratch resistance of the printing inks as well as their sliding ability, without causing wetting defects during the printing process.

What is claimed is:

1. Aqueous and radiation-curable printing varnishes and printing inks, which contain polyoxyalkylene polysiloxane copolymers of the general formula $$R^3[(OC_3H_6-)_y(OC_2H_4-)_x]R^2-$$

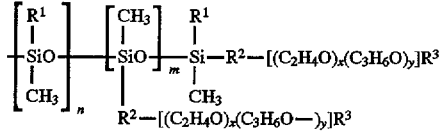

wherein $R^1$ = an alkyl group with 1 to 8 carbon atoms, $R^2 = (CH_2)_pO-$, wherein p=2, 3 or 4, $R^3$ = hydrogen, an alkyl group with 1 to 4 carbon atoms or a (meth) acryloxy group with the proviso that at least one $R^3$ is a (meth)acryloxy group, n=40 to 60 and m=0 to 3, x and y being selected so that the average molecular weight (Mw) of the polyoxyalkylene blocks is 300 to 800 g/mole and the molar ratio of x:y is 0.2 to 0.7, in amounts of 0.001 to 1.5% by weight based on the varnish and ink formulation.

2. Aqueous and radiation-curable (UV) printing varnishes and printing inks of claim 1, wherein m=0 or 1.

3. Radiation-curable (UV) printing varnishes and printing inks of claim 1, wherein the $R^3$ group is methacryloxy or acryloxy.

4. The aqueous printing varnishes and printing inks of claim 1, wherein the $R^3$ group is hydrogen or a methyl group.

* * * * *